United States Patent
Mead

(10) Patent No.: US 6,930,714 B2
(45) Date of Patent: Aug. 16, 2005

(54) HIGH SPEED FILM TO DIGITAL CONVERSION

(75) Inventor: Donald C. Mead, Carlsbad, CA (US)

(73) Assignee: Digital Cinema Systems Corporation, Los Angeles, CA (US)

(*) Notice: Subject to any disclaimer, the term of this patent is extended or adjusted under 35 U.S.C. 154(b) by 564 days.

(21) Appl. No.: 09/733,562

(22) Filed: Dec. 8, 2000

(65) Prior Publication Data

US 2002/0118281 A1 Aug. 29, 2002

Related U.S. Application Data

(60) Provisional application No. 60/169,652, filed on Dec. 8, 1999.

(51) Int. Cl.$^7$ ............................................. H04N 5/262
(52) U.S. Cl. ..................... 348/231.99; 348/311; 348/96
(58) Field of Search ..................... 348/207.99, 209.99, 348/210.99, 218.1, 222.1, 231.99, 260, 272, 294, 311, 315, 316, 320, 321, 322, 323, 96–100, 103, 105, 106, 107; 358/505, 506, 513, 514

(56) References Cited

U.S. PATENT DOCUMENTS

| | | | | |
|---|---|---|---|---|
| 4,597,012 A | * | 6/1986 | Itoh et al. | 348/308 |
| 5,644,356 A | * | 7/1997 | Swinson et al. | 348/96 |
| 5,812,191 A | * | 9/1998 | Orava et al. | 348/308 |
| 5,818,518 A | * | 10/1998 | Wordsworth et al. | 348/106 |
| 5,969,759 A | * | 10/1999 | Morimoto | 348/311 |
| 6,118,478 A | * | 9/2000 | Brett | 348/97 |

* cited by examiner

Primary Examiner—Tuan Ho

(74) Attorney, Agent, or Firm—Dickinson Wright PLLC

(57) ABSTRACT

This invention shows how an area CCD array can be partitioned into subsections to greatly improve the readout rates. Also disclosed is a technique of ping ponging the disk arrays so that the partitions can be stored for a frame time and then output to a common storage device.

20 Claims, 6 Drawing Sheets

Partitioning the Array into Four Subsections

Figure 5 Partitioning the Array into Four Subsections

HIGH SPEED FILM TO DIGITAL CONVERSION

CROSS-REFERENCE TO RELATED APPLICATIONS

This application claims the priority benefit of U.S. provisional patent application Ser. No. 60/169,652, filed Dec. 8, 1999, the disclosure of which is incorporated herein by reference.

BACKGROUND OF THE INVENTION

1. Field of the Invention

This invention permits the very high speed conversion of movie films or similar transparencies to digital form. The proposed technique can perform the conversion 60 to 120 times faster than current techniques.

2. Description of the Related Art

Currently, high quality conversion systems convert film image frames to digital by moving the film by a linear array of photodetectors. A line of picture elements on the film image is imaged onto the array of photodetectors. In most cases, this line corresponds to a horizontal line on the film image. The lines are captured for conversion to digital by either strobing the illumination source or employing a line transfer technique on the photodetector array. The individual picture elements are then analog-to-digital (ADC) converted and stored on a digital medium. Three linear photodetector arrays are employed, one for each color axis.

It can be seen that the sequence of line captures will create a frame capture once all of the individual line outputs are assembled. Thus, it can be seen that the required two axes of scan are performed with one being the linear array and the other the film motion. The horizontal accuracy is determined by the photolithographic accuracy of the semiconductor process that created the linear array and is very accurate. The vertical accuracy is determined primarily by the accuracy with which the film is moved (an alternative is to move the photodetector array, but the future trend is to move the film). In either case, the motion control is the accuracy limiting element and the cost driving part of the system.

Unwanted side-to-side motion of the film degrades accuracy and subsequent ability to compress the digital movie is impaired because individual rows are misregistered. Also, the speed of conversion is severely limited. Current state of the art is 5 seconds per frame, or $\frac{1}{120}$ of real time at 24 frames per second.

An alternative technique is to utilize a two dimensional array of photodetectors. This solves the accuracy problem for the array of picture elements and is potentially faster.

The current approach is to utilize a two dimensional array with a single serial pixel output because the CCD arrays are the same as those used in video camers and camcorders and these need a single video output. Commercial hardware with this approach still requires 5 seconds per frame. This will never approach the speeds necessary for commercial digital cinema.

SUMMARY OF THE INVENTION

This invention shows that by partitioning the readout structure of a CCD array into multiple outputs, the image pixel fidelity can be retained and the conversion speed can reach real time rates.

DETAILED DESCRIPTION OF THE INVENTION

Figure 1:
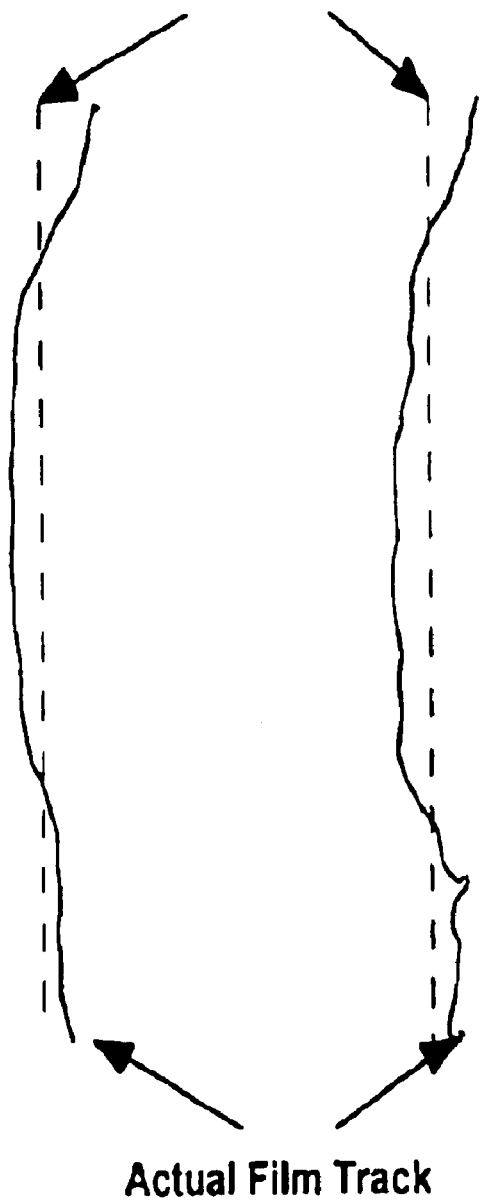
FIG. 1 shows the typical skew of the film path.
Figure 2:
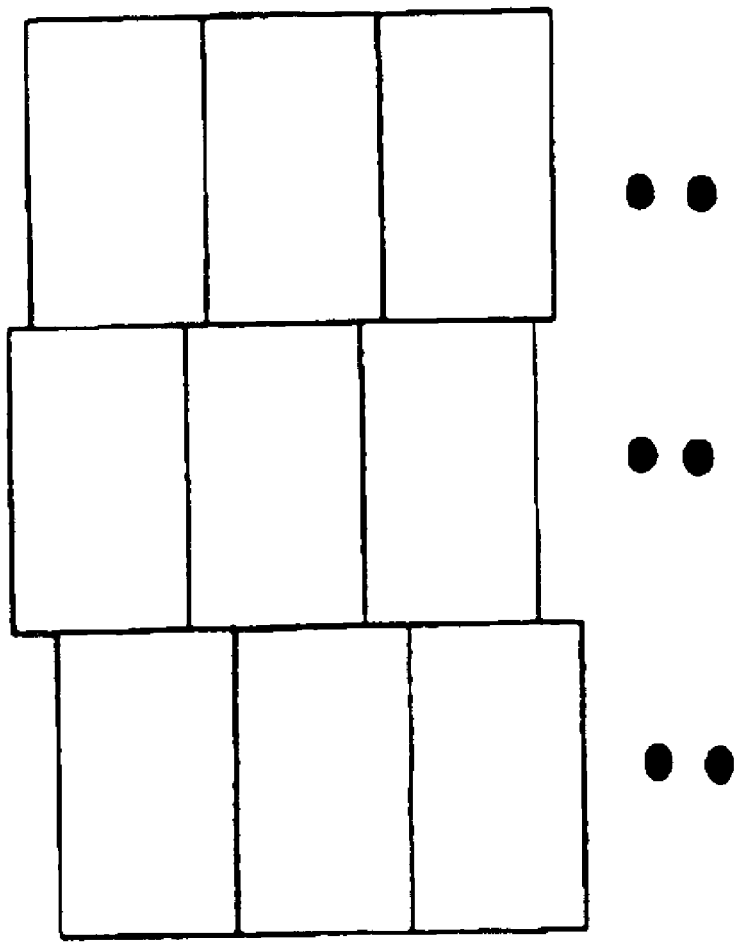
FIG. 2 shows how the pixels imaged onto a linear array of photodiodes will be misaligned when collected to form an image.

FIG. 1 shows how film can move from side to side as it is pulled longitudinally past an imaging device. If this imaging device is a linear array, the alignment of rows of pixels can be misaligned as shown in FIG. 2. While this may not seriously impair the visual quality, if the images are to be compressed, the results can be degraded by this misalignment. Thus, linear arrays are not appropriate for high speed film to digital conversion. The remainder of this description will involve 2 dimensional arrays.

Figure 3:
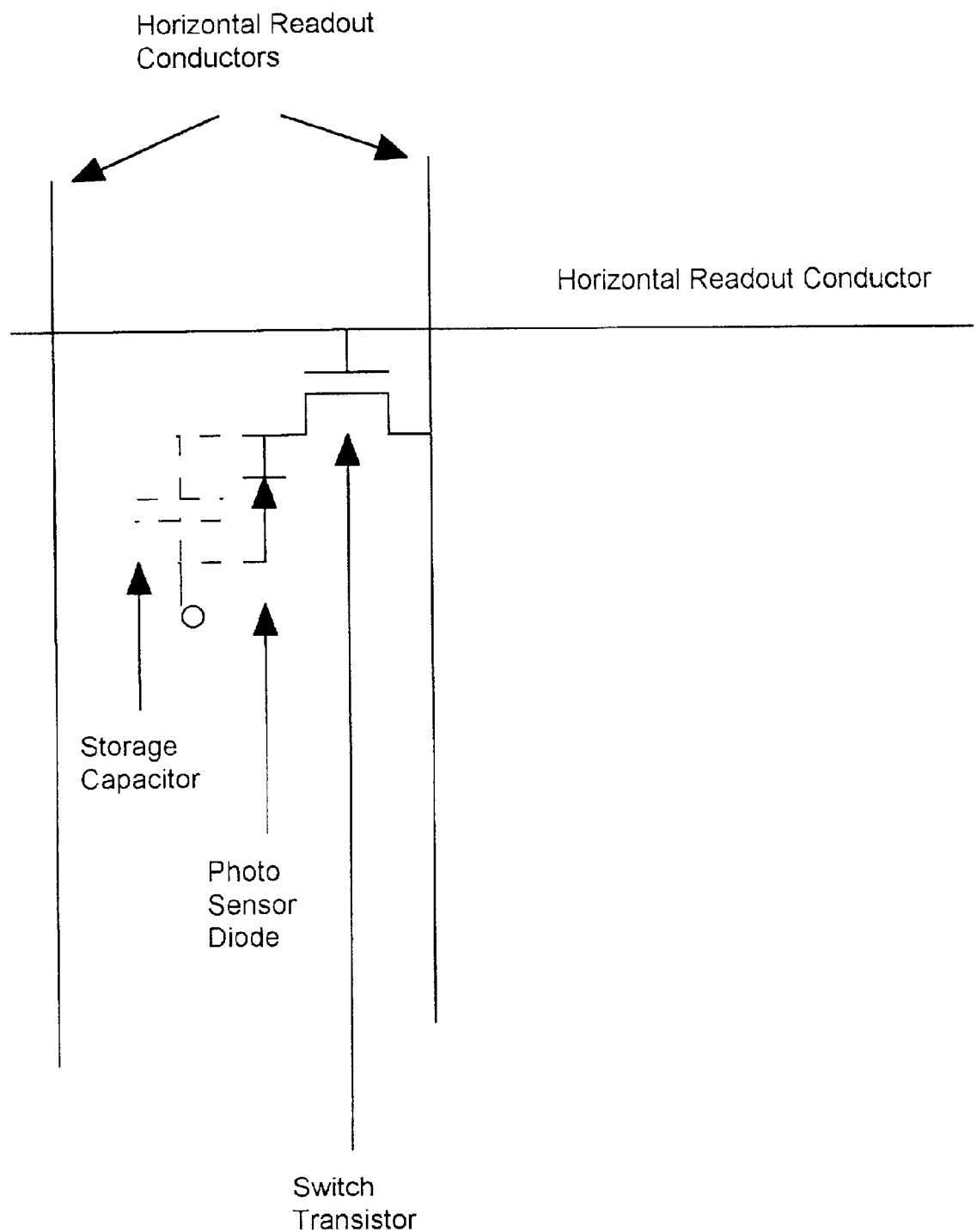
FIG. 3 shows the structure of one cell of a CCD array.

Each cell of a 2 dimensional CCD array can be modeled as shown in FIG. 3 photosensitive diode generates a current when light energy impinges on it. This current is stored on a capacitor as charge. The voltage on the capacitor is approximately proportional to the intensity of the light hitting it.

Figure 4:
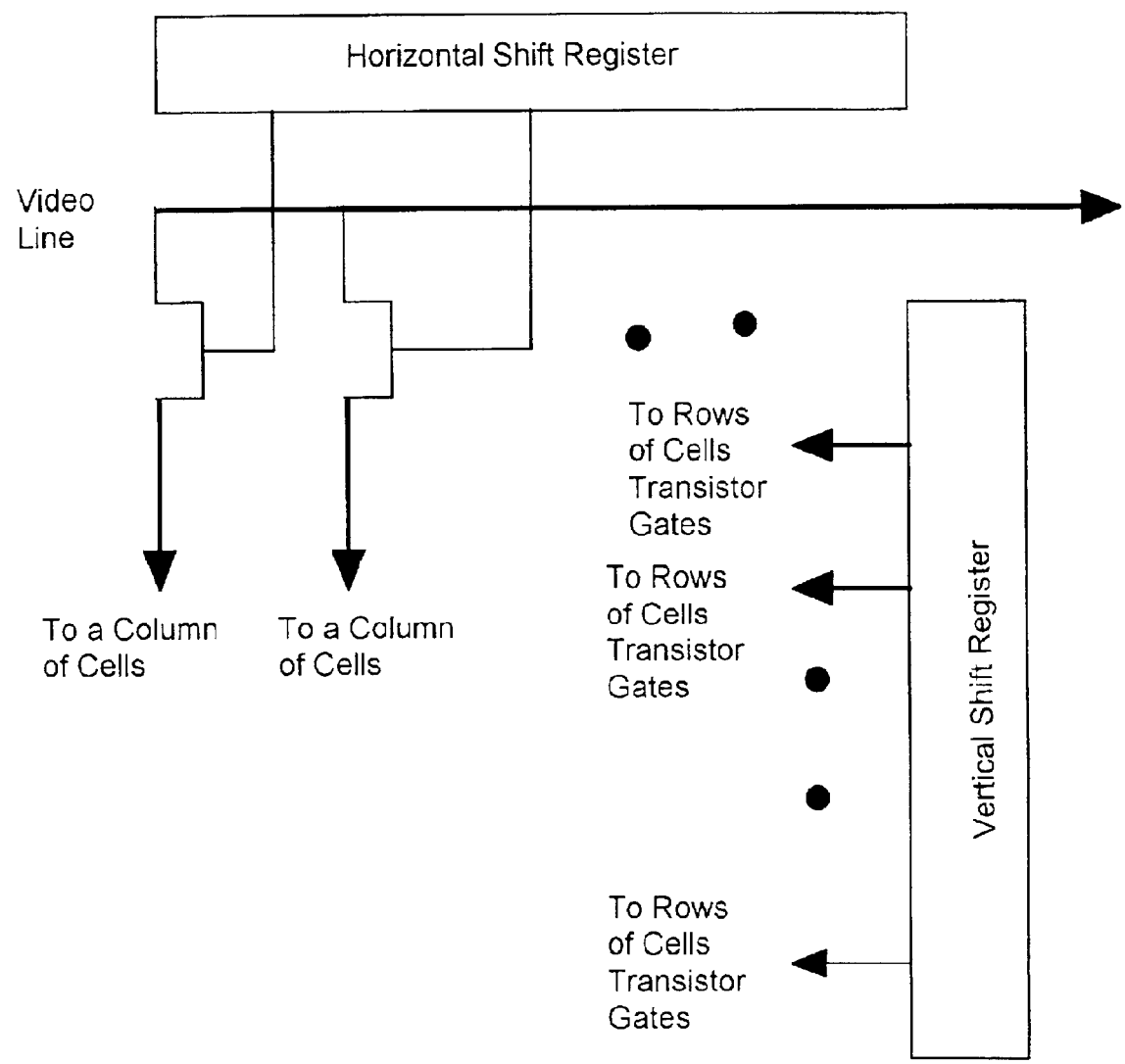
FIG. 4 shows the readout structure for a CCD array.

FIG. 4 shows how the rectangular array of CCD cells shown in FIG. 3 is multiplexed onto a single video line. Consider a logical 1 in the leftmost storage element of the Horizontal Shift Register and in the top storage element of the Vertical Shift Register. Transistor A is turned on and the voltage on the capacitor in the upper left corner becomes the output on the video line. At the end of a pixel period, the logical 1 is moved to the second position in the Horizontal Shift Register, with the first position being set to logical zero. At this point the voltage on the second capacitor in the first row of the array becomes the output on the video line. This process continues until the last cell in the first row is selected. At the end of this pixel, the logical 1 in the Vertical Shift Register is moved down one position and the logical 1 in the Horizontal Shift Register moves back to the left most storage element.

This process continues left to right and top to bottom until all of the pixel cells have been read out.

If N is the total number of pixels and T is the period of each pixel, the total time to read out the complete array is $N*T$. For example, if the readout rate is $10^7$ pixels per second(near the maximum possible), and the number of pixels is $8*10^6$ the readout time would be 0.8 seconds. If the array readout period corresponds to a film frame which is approximately 0.0417 seconds. Thus, the readout needs to be sped up by a factor of over 19 if the conversion is to be in real time.

Figure 5:
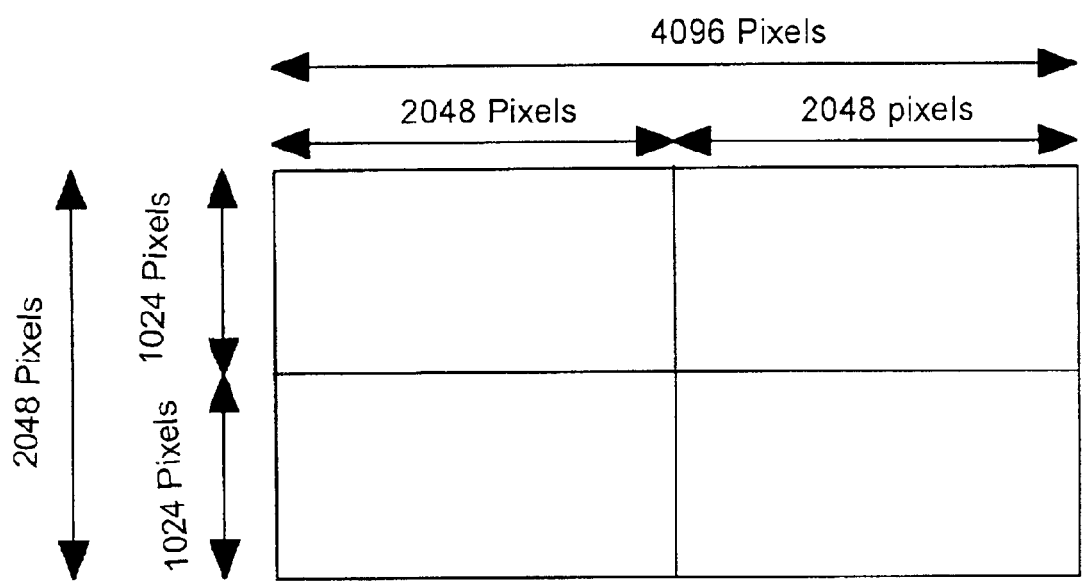
FIG. 5 shows the partitioning of the array into four subsections.
Figure 6:
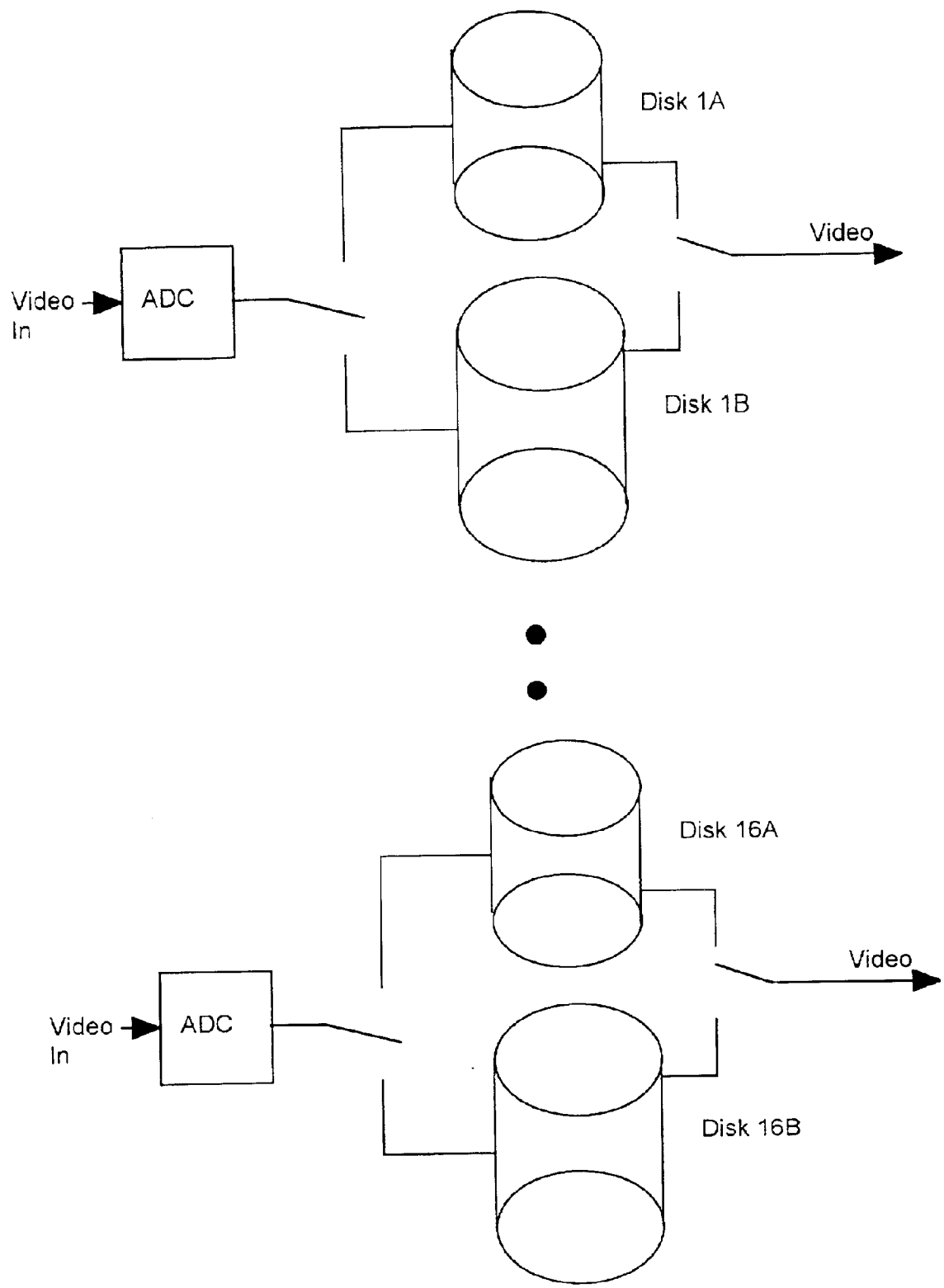
FIG. 6 shows an example output storage structure.

FIG. 4 gives a hint of how this can be achieved: partition the readout structure so that there are multiple readouts. FIG. 5 shows how an array could be partitioned into four separate readout structures. The resulting readout would be the same as if four separate videos were being generated. Each readout subsection would have its own Horizontal Shift Register and Vertical Shift Register each of which could be shorter than the original.

In a practical film to digital there would be three separate arrays, one for each primary color. The intensity for each color of each pixel should be carried with a minimum of 10 bits each, for a total of 30 bits per pixel or 4 bytes. The output rate is 768 Mbytes per second, or 192 Mpixels per second. The partitioning reduces these numbers by a factor of 4.

The partitioning noted above can be continued almost indefinitely. For example, one practical implementation would have 8 horizontal partitions and 2 vertical partitions, which would improve the output rate by a factor of 16.

Using the eight by two partition, the output rate for each would be 48 Megabytes per second, well within the capability of modern disks.

A further part of this invention is that the output of each of the partitions are analog to digital(ADC) converted and stored on a high speed disk. In this invention the output of each partition ADC is ping ponged onto a pair of disks.

While one set of disks is reading and storing the output of the CCD array, the other set is playing out the previous frame to a common storage device.

What is claimed is:

1. An apparatus for converting film images to a digital format comprising:
   a photodetector system, said photodetector system being capable of detecting a plurality of film image components;
   a film holder aligned with said photodetector system;
   said photodetector system including at least one light activated array;
   said at least one array including at least two subsections wherein each subsection is assigned at least one independent shift register;
   a plurality of digital recording media, said plurality of digital recording media being operatively interconnected with an output from each of said at least two subsections;
   a common storage device, said common storage device being operatively interconnected with said plurality of digital recording media; and
   a controller, said controller being capable of simultaneously directing storage of a first subset of said film image components onto said plurality of digital recording media and directing storage of a second subset of said film image components onto said common storage device.

2. An apparatus as set forth in claim 1, wherein said photodetector includes at least three separate arrays, each separate array corresponding to a primary color.

3. An apparatus as set forth in claim 1, wherein each subsection contains a separate horizontal shift register.

4. An apparatus as set forth in claim 1, wherein each subsection contains a separate vertical shift register.

5. An apparatus as set forth in claim 1, wherein said at least one array contains four subsections.

6. An apparatus as set forth in claim 5, wherein each of said four subsections contains a separate horizontal shift register.

7. An apparatus as set forth in claim 6, wherein each of said four subsections contains a vertical shift register.

8. An apparatus as set forth in claim 1, wherein said controller is capable of directing storage of said second subset of said film image components onto said common storage device from said plurality of digital recording media.

9. An apparatus as set forth in claim 8, wherein said controller is capable of alternating storage of said first subset of said film image components between each of said plurality of digital recording media.

10. An apparatus as set forth in claim 9, wherein said controller is capable of alternately directing said first subset of said film image components stored in each of said plurality of digital recording media to said common storage device.

11. An apparatus as set forth in claim 10, wherein said controller contains a timing mechanism generating a timing signal corresponding to a frame size of said film.

12. A method for converting a film image to digital format comprising:
   providing a film holder;
   aligning said film holder with a photodetector system;
   projecting images from said film to at least two subsections of a light activated array of said photodetector system;
   creating independent data streams related to said film image for each of said at least two subsections of said array; and
   simultaneously directing the storage of said independent data streams onto a plurality of digital recording media and a common storage device.

13. A method as set forth in claim 12, wherein creating independent data streams includes directing image data from each of said at least two subsections to at least one separate shift register corresponding to a subsection.

14. A method as set forth in claim 13, wherein creating independent data streams includes directing image data of each subsection to an independent corresponding horizontal shift register.

15. A method as set forth in claim 13, wherein creating independent data streams includes directing image data of each subsection to an independent corresponding vertical shift register.

16. A method as set forth in claim 13, wherein images from said film are projected to at least two subsections of each of three light activated arrays, each of said three light activated arrays corresponding to a primary color.

17. A method as set forth in claim 13, wherein said film images are projected to at four subsections of said light activated array.

18. A method as set forth in claim 13, wherein said step of directing the storage of said independent data streams onto said common storage device comprises reading said independent data stream from said plurality of digital recording media.

19. A method as set forth in claim 18, wherein said step of simultaneously directing the storage of said independent data streams onto said plurality of digital recording media comprises alternating the recordation of said data streams between each of said plurality of digital recording media.

20. A method as set forth in claim 19, wherein said step of directing the storage of said independent data streams onto said common storage device comprises alternating from which of said plurality of digital recording media said independent data streams are read.

* * * * *